2,918,129

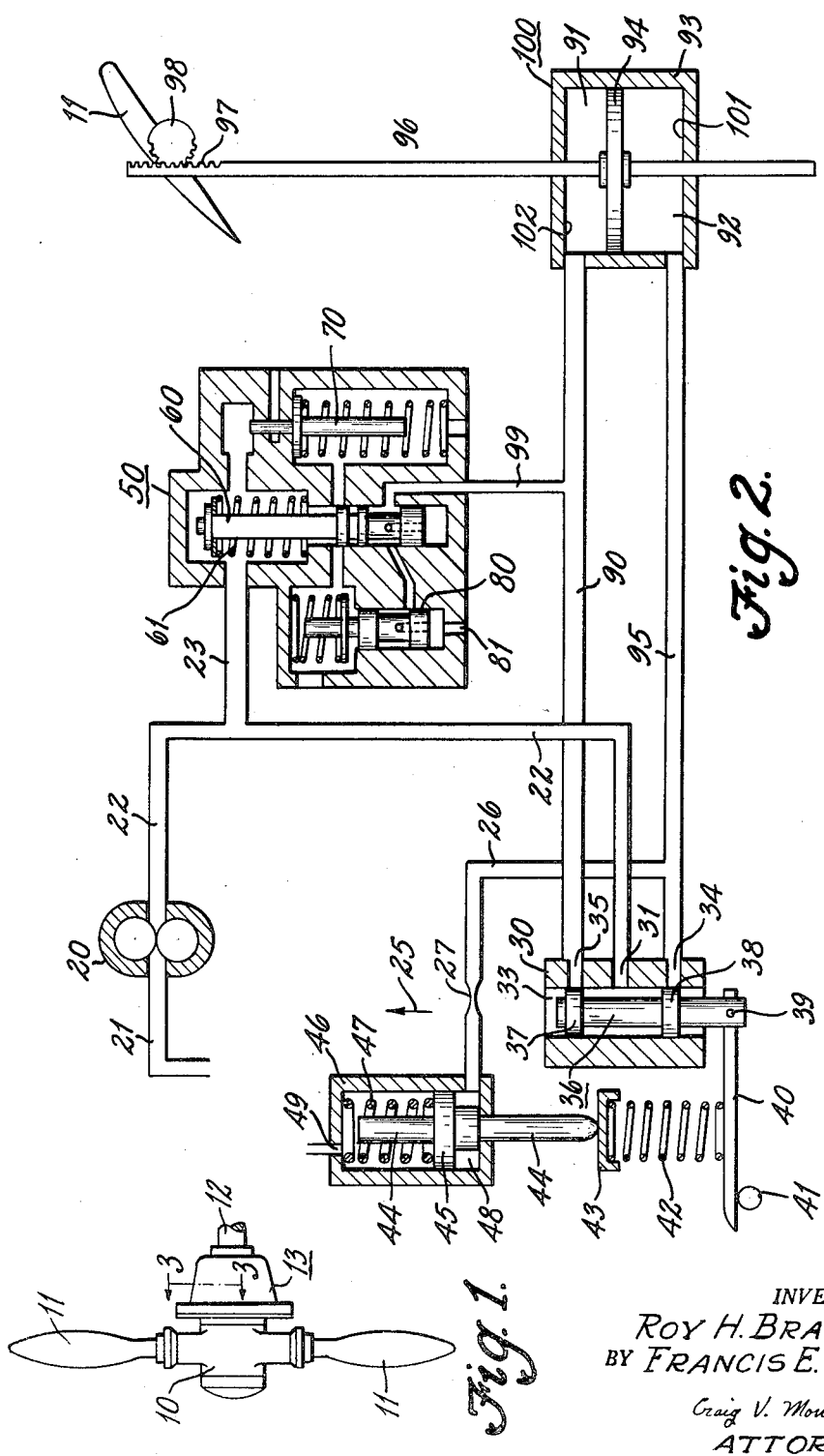

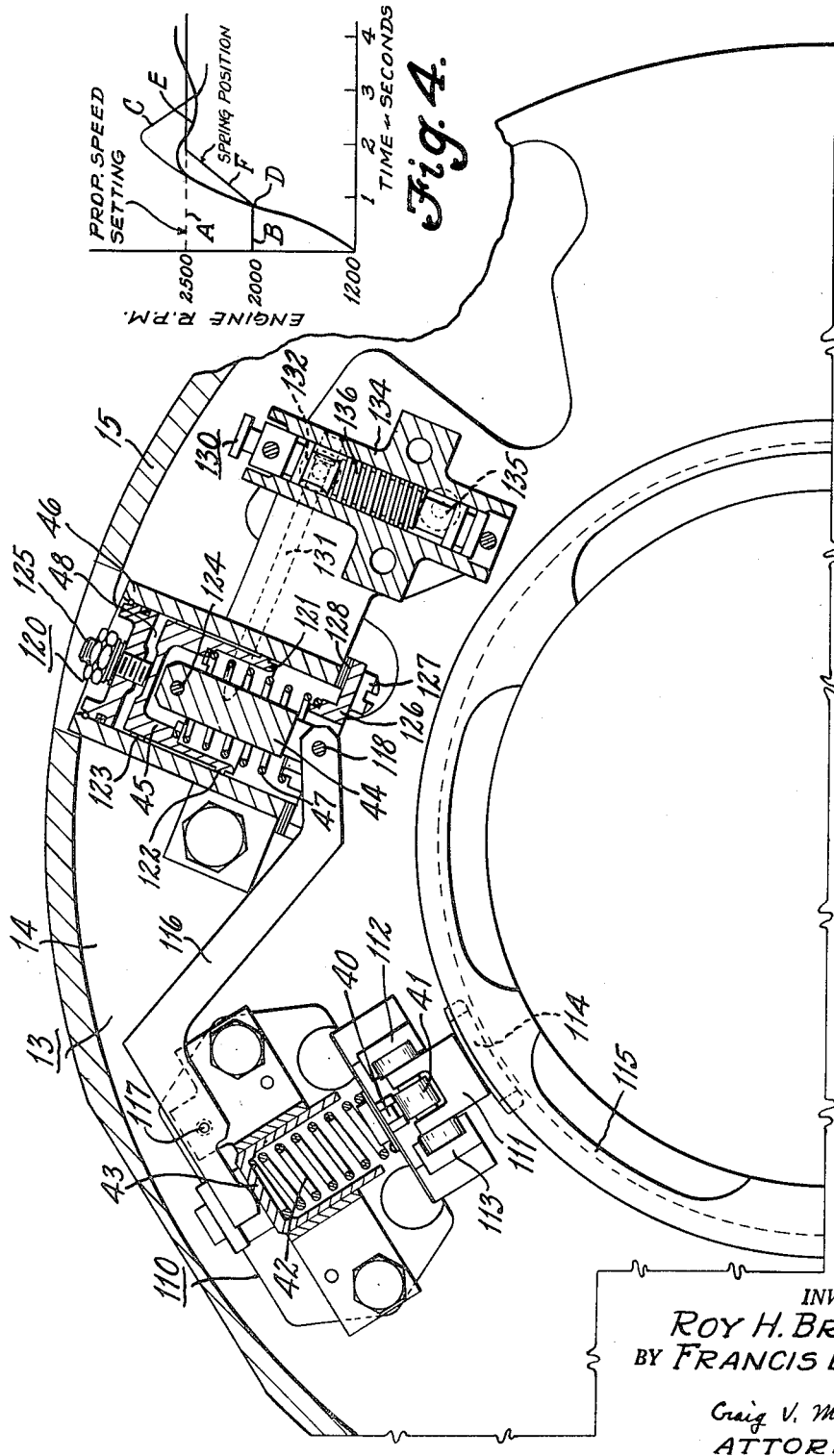

PROPELLER CONTROL SYSTEM

Roy H. Brandes, Dayton, and Francis E. Conn, Piqua, Ohio, assignors to General Motors Corporation, Detroit, Mich., a corporation of Delaware Application March 24, 1954, Serial No. 418,324

11 Claims. (Cl. 170—160.21)

This invention pertains to means for controlling variable pitch propellers, and particularly to an improved governor for a variable pitch propeller controlled by a fluid pressure system.

It has been observed that propeller speed, and perforce prime mover speed, increases substantially above the preselected control speed during throttle bursts at low air speeds and engine speeds, when the propeller is at the low pitch stop position. Heretofore, the governor control systems were of the proportionalizing type, that is, corrections tending to increase propeller load, or pitch, were not initiated until propeller speed attained the control speed setting of the governor. Thus, the propeller experienced an overspeed of substantial magnitude during a sudden throttle burst while the propeller was at the low pitch stop position. Operation of prior systems would be greatly enhanced if the governor were anticipatory, i.e. if the governor would operate to increase propeller pitch before the propeller reaches a speed equal to the governor speed setting, during a throttle burst. Accordingly, among our objects are the provision of an anticipatory governor for a speed controlling system; the further provision of automatically operable means responsive to a particular load condition of the propeller for adjusting the governor speed setting; and the still further provision of a fluid pressure system for controlling a variable pitch propeller including a spring biased governor valve and means for automatically adjusting the spring load thereon in accordance with a particular load condition of the propeller.

The aforementioned and other objects are accomplished in the present invention by incorporating means responsive to a particular load condition of the propeller for reducing the speed setting of a governor, and operable to reset the governor at a fixed rate to the selected control setting thereof in response to a particular change in the propeller load condition. Specifically, the variable pitch propeller of this invention is controlled by a fluid pressure system which includes a fluid pressure source, a servo-motor for increasing or decreasing propeller pitch, a valve for controlling the application of pressure fluid to the servo-motor, and governor means for controlling the operation of the valve. As disclosed herein, the valve includes a centrifugally responsive piston which constitutes a component of the governor means. The valve piston is pivotally interconnected with a lever having a fulcrum point, which lever is engaged by a spring for opposing movement of the valve piston under the urge of centrifugal force. When the opposing forces acting on the valve piston are in equilibrium, the propeller is rotating at the selected speed setting. In some instances, it may be desirable to vary the selected speed setting of the governor, in which case the fulcrum point may be displaced so as to vary the mechanical advantage of the lever.

In the present invention, the load of the governor spring may also be varied to change the governor speed setting. The load on the governor spring setting may be adjusted by a fluid pressure actuator which responds to a particular condition of the propeller control system. Thus, when the propeller is at the low pitch stop position and is rotating below the selected speed setting of the governor, the valve will be applying pressure fluid from the source to the servo-motor in a pitch decreasing direction. However, inasmuch as the propeller is at the low pitch stop position, a further decrease in propeller pitch cannot be obtained. At this time, the actuator is operated so as to reduce the spring load on the lever, thereby decreasing the speed setting of the governor by a predetermined amount. If at this time, a throttle burst occurs, which results in a sudden increase in propeller speed, the governor will respond and enable the valve to apply pressure fluid so as to increase propeller pitch as soon as propeller speed exceeds the reduced speed setting of the governor. Thus, the load of the propeller is increased by increasing the pitch thereof before the propeller attains a speed equal to the normal control speed setting of the governor. Moreover, as soon as the valve directs pressure fluid to the servo-motor in an increased pitch direction, the actuator is connected to drain through a fixed restriction whereby the governor spring load is readjusted at a fixed rate to the normal speed setting thereof. In this manner, it has been observed that excessive propeller overspeeds are effectively prevented, inasmuch as the governor can be said to display anticipatory action.

Further objects and advantages of the present invention will be apparent from the following description, reference being had to the accompanying drawings wherein a preferred embodiment of the present invention is clearly shown, and wherein similar reference characters denote similar parts throughout the several views.

Fig. 1 is a view, in elevation, of a variable pitch propeller constructed according to this invention.

Fig. 2 is a schematic diagram of the fluid pressure control system of this invention.

Fig. 3 is a fragmentary view, partly in section and partly in elevation, taken along line 3—3 of Fig. 1.

Fig. 4 is a graph comparing operation of the control system of this invention and prior control systems.

With particular reference to Fig. 1, the control system of this invention may be incorporated in a variable pitch propeller including a hub 10 having a plurality of blade sockets within which propeller blades 11 are supported for rotation about their longitudinal axes. The propeller hub is adapted to be rotated by a shaft 12, which is connected to any suitable prime mover, not shown. The hub 10 also has attached thereto and rotatable therewith a regulator assembly 13 within which components of the fluid pressure system to be described, are disposed. Structurally, the propeller assembly may be of the type disclosed in Patent No. 2,536,138, Moore.

With particular reference to Fig. 2, the fluid pressure control system includes a pump 20, which is driven during propeller rotation and constitutes a source of fluid pressure. The pump 20 has an intake connected with a conduit 21, which connects with a reservoir of fluid contained within the regulator assembly 13 of Fig. 1. The pump 20 has an outlet connected to a conduit 22, which is connected to a branch conduit 23 that, in turn, is connected with a pressure control valve assembly 50. The pressure control valve assembly 50 is of the type disclosed in the aforementioned Patent No. 2,536,138, and comprises an equal area valve 60, a relief valve 70 and a constant leak valve 80. As the pressure control valve assembly 50 forms no particular part of this invention, it will not be described in detail. Suffice it to say that the equal area valve 60 controls the potential of pressure fluid in conduit 22 in accordance with the requirements of the pitch changing servo-motor, as will be alluded to hereinafter. The pressure relief valve 70 merely prevents the pressure from exceeding a predetermined maximum potential, and the constant leak valve 80 functions to bleed a constant volume of fluid from the increase pitch conduit during onspeed propeller operation, as will be more particularly described hereinafter.

The conduit 22 communicates with a supply port 31 of a valve guide 30, which constitutes part of a governor valve assembly 110. The valve guide 30 is formed with a through bore 33 having spaced ports 34 and 35. A valve piston, or plunger, 36 is received within the valve guide through bore 33, and supported therein for reciprocable movement. The valve piston 36 is formed with a pair of longitudinally spaced lands 37 and 38 arranged to control communication between ports 34 and 35 and the through bore 33. The piston 36 is mounted radially within the regulator assembly 13 so as to respond directly to the thrust of centrifugal force which is indicated by the arrow 25 in Fig. 2. The piston is pivotally interconnected at 39 to a lever 40. One end of the lever 40 engages a fulcrum point, or roller, 41, which may be moved relative to the lever 40 so as to vary the mechanical advantage thereof and, thus, vary the speed setting of the governor to be described. An intermediate portion of the lever 40 is engaged by one end of a compression spring 42, the other end of which engages a spring seat 43. The spring seat, or guide, 43 is, in turn, engaged by a rod extension 44 of an actuator piston 45 disposed within a cylinder 46. The piston 45 is biased to one limit position, as shown in Fig. 2, by a spring 47.

The valve piston 36 controls the application of pressure fluid from conduit 22 to either conduit 90 or conduit 95, which are connected, respectively, with ports 35 and 34 of the valve guide 30. Conduit 90 communicates with an increase pitch chamber 91 of a servo-motor 100, while conduit 95 communicates with a decrease pitch chamber 92 of the servo-motor. The servo-motor 100 is shown schematically as including a cylinder 93 having disposed therein a reciprocable piston 94 having equal areas exposed to both cylinder chambers. The piston 94 includes a rod portion 96, which is shown schematically as having a rack portion 97 in engagement with a pinion gear 98, which is connected to the propeller blade 11. The servo-motor 100 is constructed to vary the pitch position of the propeller from a low pitch stop position in the positive thrust range to a high pitch stop position in the positive thrust range. The low pitch stop position is determined by engagement of the piston 94 with the upper wall 102 of the cylinder 93, and the high pitch stop position is determined by engagement of piston 94 with the lower wall 101 of the cylinder 93, as viewed in Fig. 2. Thus, it may be said that the propeller embodies a physical low pitch stop.

As previously alluded to, the piston 36 responds directly to the thrust of centrifugal force in the direction of arrow 25 and, thus, constitutes a component of the governor for maintaining propeller speed substantially constant at the preselected control speed setting. The other components of the governor comprise the lever 40, the fulcrum roller 41 and the spring 42. Due to the arrangement of the lever 40 and the spring 42 with reference to the roller 41, it will be appreciated that the opposing forces to which the piston 36 is subjected during propeller rotation will be in equilibrium at a predetermined rotative speed of the propeller as determined by the position of roller 41. For the purposes of the present invention, the position of fulcrum roller 41 can be considered fixed, in which instance, the governor spring 42 exerts a force tending to move the lever 40 in a clockwise direction about the roller 41, as viewed in Fig. 2, while the thrust of centrifugal force on the piston 36 tends to move the lever 40 in a counterclockwise direction about the fulcrum roller 41. With a predetermined spring force, the piston 36 will assume an equilibrium position, wherein the piston lands have the relationship with the valve guide ports as shown in Fig. 2, at the preselected control speed.

Due to the fact that the propeller blades of the instant propeller are subject to external aerodynamic and centrifugal twisting moments, which tend to rotate the blades 11 about their longitudinal axes to a low pitch position, in the equilibrium, or onspeed, position of the piston 36, the port 35 is slightly open to the bore 33 and, hence, is connected to the pressure supply conduit 22 through port 31, as shown in Fig. 2. As a reference to the aforementioned Patent 2,536,138, will reveal, sufficient flow is permitted from the conduit 22 to the conduit 90 during onspeed conditions to supply the losses due to normal leakage in the system, as well as leakage through conduit 99 and the constant leak orifice 81 so as to maintain pressure in the increase pitch chamber 91, which exactly balances and opposes the external blade forces which tend to reduce the pitch position of the propeller. Upon an increase in propeller speed above the speed setting of the governor, the piston 36 will move upwardly, as viewed in Fig. 2, to increase the opening of port 35 whereby a volume of fluid under pressure greater than the normal leakage of the system and the leakage through orifice 81 is supplied to conduit 90, which effects a downward movement of the piston 94 so as to increase the pitch position of the propeller to thereby increase the load on the prime mover driving the propeller so as to correct for the speed error. At the same time, the decrease pitch chamber 92 is connected to drain through conduit 95, port 34 and the valve guide through bore 33. Conversely, should the propeller speed decrease below the speed setting of the governor, the force of spring 42 will move the piston 36 downwardly, as viewed in Fig. 2, so as to completely close port 35, or in instances where the speed error is sufficiently great, to open port 35 to drain, while port 34 is connected to port 31 and pressure fluid is supplied through conduit 95 to the decrease pitch chamber 92. Thus, all governing is accomplished by controlling flow through port 35. Inasmuch as the external forces acting on the propeller blades are sufficient to reduce propeller pitch, the potential of pressure supplied through conduit 95 is nominal, and is merely sufficient to maintain the decrease pitch chamber 92 substantially full of fluid to prevent the existence of voids therein.

By reason of the equal area valve 60 being connected to the increase pitch conduit 90 through conduit 99, it will be appreciated that when the propeller is overspeeding, the potential of pressure fluid supplied to the increase pitch chamber 91 will be controlled in accordance with the requirements of the servo-motor. In other words, the equal area valve 60 maintains a definite pressure differential between the source 20 and the conduit 90 so that sufficient pressure is available at all times to accomplish the pitch changing requirements of the servo-motor in an increasing pitch direction. Thus, if the port 35 is completely open to the supply port 31, the pressure potential in conduit 90 will be high, whereas if the port 35 is only slightly open to the supply port 31, the pressure in conduit 90 will be low.

However, inasmuch as virtually no pressure is required to effect servo-motor movement in a decreasing pitch direction, the pressure potential of fluid in conduit 22 is reduced to a minimum value when port 34 is connected with port 31. This minimum pressure value is substantially equal to the force of the equal area valve spring 61, which may be on the order of 400 p.s.i. As shown in Fig. 2, the decrease pitch conduit 95 is connected with a branch conduit 26 having a fixed restriction 130 which is shown schematically as a small orifice 27, the conduit 26 communicating with a servo chamber 48 of the cylinder 46 on one side of the piston 45. As shown in Fig. 2, the piston 45 divides the cylinder 46 into a servo chamber 48 and a chamber for the spring 47, which has a drain outlet 49. The actuator piston 45 is employed to reduce the load on governor spring 42 during a particular load condition of the propeller. More specifically, the actuator piston 45 is exposed to the pressure in chamber 48, which pressure exerts a force on the piston tending to move it upwardly, as viewed in Fig. 2.

The spring 47 is chosen so that it resists movement of piston 45 until the pressure in chamber 48 is substantially equal to the maximum decrease pitch pressure of 400 p.s.i. When the pressure in conduit 95 approaches 400 p.s.i., the actuator piston 45 will move upwardly so that the upper portion of rod 44 will engage the upper wall of cylinder 46, thereby reducing the load on spring 42. This condition will only exist when the port 34 is fully open to the port 31, which condition will only prevail when the propeller is rotating substantially below the selected speed setting and the servo-motor piston 94 is in engagement with the wall 102 of the cylinder 93, at which time, the propeller is at the low pitch stop position.

With reference to Fig. 4, the operation of the actuator in resetting the load on the governor spring 42 is depicted graphically. In the graph the abscissa represents time in seconds, while the ordinate represents engine or propeller r.p.m. The normal control speed setting of the governor is illustrated by a horizontal line A, which is equivalent to 2500 r.p.m. When the actuator piston 45 is moved upwardly into engagement with the upper wall of cylinder 46, the governor spring load is adjusted so that the governor speed setting is substantially 2000 r.p.m., as indicated by line B. If at this time, i.e. when the propeller speed is below 2000 r.p.m., say 1200 r.p.m., and the governor speed setting is 2000 r.p.m., a throttle burst should occur, thereby resulting in acceleration of the engine and propeller, the propeller speed would normally follow the curve C, as indicated in Fig. 4. Thus, it appears that the propeller would have to reach a speed of 2500 r.p.m. before the governor would respond and exert a corrective effect. However, with the system of this invention, the governor will become operative to increase propeller pitch and thereby increase engine load when the propeller speed reaches 2000 r.p.m., as indicated by point D, thereby resulting in a control curve, as depicted by the letter E. Thus, it may be seen that propeller overspeed is considerably reduced due to the anticipatory action of the governor.

As soon as a speed of 2000 r.p.m. is reached by the propeller with the propeller at the low pitch stop position, the governor valve piston 36 will move upwardly, as viewed in Fig. 2, so as to apply pressure fluid to the conduit 90 and the increase pitch chamber 91. At this time, the conduit 95, as well as the conduit 26, will be connected to drain, and the spring 47 will force fluid from the servo chamber 48 at a constant rate through the orifice 27. In this manner, the load on the governor spring 42 is readjusted to the normal control speed setting at a constant rate, as indicated by the line F in Fig. 4.

With reference to Fig. 3, the physical location of several components of the fluid pressure system disposed schematically in Fig. 2 will be described. As previously alluded to, all components of the fluid pressure system are disposed within the regulator assembly 13, which includes an annular front wall 14 and a cover 15. The governor valve assembly is depicted generally by the numeral 110, the actuator by the numeral 120, and the fixed restriction by the numeral 130. The governor valve assembly 110 is mounted on the front plate 13 so that the governor valve piston is radially arranged with respect to the axis of rotation and thereby responds directly to the thrust of centrifugal force. The governor spring 42 is shown having one end confined within the spring guide 43 and the other end resting on the lever 40. The roller 41 is mounted in a carriage 111, which is supported for longitudinal movement by a pair of track members 112 and 113. The carriage 111 is attached to a shoe 114, which is received in a control ring 115 which may be moved longitudinally within the regulator housing 15, in a manner similar to that shown in the aforementioned Patent 2,536,138. The end of the spring guide 43 is engaged by one end of a bellcrank 116, which is pivoted at 117 to the housing of the governor valve assembly 110. The other end of bellcrank 116 is pivotally connected at 118 to the rod 44 of the actuator piston 45. Structurally, the piston 45 is formed with an annular skirt 121 having an external shoulder 122, which sealingly engages the internal periphery of cylinder 46. The piston 45 is also formed with a plurality of circumferentially spaced guide projections 123. Thus, the servo chamber 48 extends around the periphery of the piston 45 and the skirt portion 121 to the annular sealing shoulder 122. This chamber 48 is connected by a bore 131 to a port 132 of the fixed restriction 130. Structurally, the fixed restriction comprises a guide 134 having a through bore communicating with ports 132 and 135. A threaded member 136 is disposed within the through bore and functions to meter the flow of fluid between ports 132 and 135 so as to provide the necessary time delay in resetting the load on the governor spring 42. Moreover, the restriction constituted by the threaded member 136 is arranged to allow a constant rate of flow from the servo chamber 48 under the urge of spring 47 so that the load on the governor spring 42 will be reset at a fixed rate as indicated by line F in Fig. 4.

The piston 45 is shown interconnected with the rod 44 through a cross pin 124, outward movement of the piston 45 in Fig. 3 being limited by engagement of the piston head surface with a stud 125 secured to the cylinder head. Inward movement of the piston 45, as viewed in Fig. 3, is limited by engagement of the piston skirt 121 with an annular member 126 attached to the cylinder 46 by bolts 127. Moreover, the stroke of the piston 45 may be adjusted by interposing shims 128 between the annular member 126 and the cylinder wall 46 so that the adjustment of the governor valve spring 42 by the actuator 120 may be varied.

The operation of the structural embodiment depicted in Fig. 3 is similar in all respects to that discussed with reference to a schematic illustration in Fig. 2. Thus, when the maximum decrease pitch pressure is transmitted through the restrictor assembly 130 and passage 131 to the servo chamber 48, the piston 45 will move inwardly, thereby effecting clockwise movement of the bellcrank, as viewed in Fig. 3. In this manner, the load on the governor spring will be reduced. Conversely, when port 135 of the restrictor 130 is connected to drain, the spring 47 will urge the piston 45 outwardly to the position indicated in Fig. 3 at a constant rate, which rate is determined by the flow restriction of threaded member 136. In this manner, counterclockwise movement will be imparted to the bellcrank 116 so as to reload the governor spring 42 to its normal value.

From the foregoing, it is apparent that the present invention provides simple means for rendering a governor anticipatory so as to prevent undesirable overspeeding upon the occurrence of throttle burst when the propeller is at the low pitch stop position at the instant of the throttle burst. Moreover, the governor resetting mechanism will have no adverse effect on the propeller control system if the mechanism fails to operate.

While the embodiment of the present invention as herein disclosed, constitutes a preferred form, it is to be understood that other forms might be adopted.

What is claimed is as follows:

1. A fluid pressure system for controlling a variable pitch propeller, including in combination, a variable pitch propeller, a source of fluid pressure, a double-acting servo-motor operatively connected to said propeller for increasing or decreasing the pitch thereof, stop means operatively connected with said propeller for limiting the low pitch position thereof, a valve connected with the source and the servo-motor for applying pressure fluid thereto for increasing or decreasing propeller pitch, governor means having a predetermined control speed setting and connected with said valve for controlling operation thereof to thereby control propeller pitch so that propeller speed is maintained substantially constant at said control speed setting, and means operatively connected with said governor means and responsive to operation of said valve in applying fluid under maximum decrease pitch pressure to said servo-motor tending to decrease propeller pitch when the propeller is at the low pitch stop position for positively automatically reducing the speed setting of said governor means.

2. A fluid pressure system for controlling a variable pitch propeller, including in combination, a variable pitch propeller, a source of fluid pressure, a double-acting servo-motor operatively connected to said propeller for increasing or decreasing the pitch thereof, stop means operatively connected with said propeller for limiting the low pitch position thereof, a valve connected with the source and the servo-motor for applying pressure fluid thereto for increasing or decreasing propeller pitch, governor means having a predetermined control speed setting and connected with said valve for controlling operation thereof to thereby control propeller pitch so that propeller speed is maintained substantially constant at the control speed setting, and means operatively connected with said governor means for positively adjusting the speed setting of said governor means, the construction and arrangement being such that the speed setting is automatically decreased a predetermined amount in response to operation of said valve in applying fluid under maximum decrease pitch pressure to said motor tending to decrease propeller pitch when said propeller is at the low pitch stop position, and the predetermined speed setting is automatically increased at a fixed rate to the control speed setting in response to operation of said valve in applying pressure fluid to said motor to increase propeller pitch from the low pitch stop position.

3. A fluid pressure system for controlling a variable pitch propeller, including in combination, a variable pitch propeller, a double-acting servo-motor operatively connected to said propeller for adjusting the pitch position thereof, stop means operatively associated with said servo-motor for limiting the low pitch position of said propeller, a source of fluid pressure for actuating said servo-motor, a governor operated valve having a selected speed setting, said valve being connected with the source and with the servo-motor for controlling the application of pressure fluid to said servo-motor in response to deviations in propeller speed from the selected speed setting of said governor operated valve, means operatively connected with said governor operated valve and responsive to operation of said valve in applying fluid under maximum decrease pitch pressure to said servo-motor tending to decrease propeller pitch when the propeller is at the low pitch stop position for positively reducing the speed setting of said governor operated valve, and means operatively connected with said governor operated valve and responsive to the application of pressure fluid by said valve so as to increase propeller pitch from said low pitch stop position after the governor speed setting has been so reduced for positively increasing the speed setting of said governor operated valve at a fixed rate to the selected speed setting thereof so as to limit dangerous propeller overspeeds.

4. A fluid pressure system for controlling a variable pitch propeller, including in combination, a variable pitch propeller, a source of fluid pressure, a double-acting servo-motor operatively connected to said propeller for increasing or decreasing the pitch thereof, stop means limiting the low pitch position of said propeller, a valve connected with the source and with the servo-motor for applying fluid pressure thereto for increasing or decreasing propeller pitch, governor means having a predetermined control speed setting and connected with said valve for controlling operation thereof to thereby control propeller pitch so that propeller speed is maintained substantially constant at said control speed setting, and a fluid pressure operated actuator connected with said valve and with said governor means for positively reducing the speed setting thereof, said actuator only being operable to reduce the speed setting of said governor means when said valve is applying fluid under substantially maximum decrease pitch pressure to said servo-motor tending to decrease propeller pitch with the propeller at the low pitch stop position.

5. A fluid pressure system for controlling a variable pitch propeller, including in combination, a variable pitch propeller, a source of fluid pressure, a double-acting servo-motor operatively connected to said propeller for increasing or decreasing the pitch thereof, stop means limiting the low pitch position of said propeller, a valve connected with the source and with the servo-motor for applying fluid pressure thereto for increasing or decreasing propeller pitch, governor means having a predetermined control speed setting and connected with said valve for controlling operation thereof to thereby control propeller pitch so that propeller speed is maintained substantially constant at said control speed setting, a fluid pressure operated actuator operatively connected with said governor means for positively varying the speed setting thereof, said actuator including a cylinder having disposed therein a piston capable of fluid pressure actuation in one direction and continuously acting means urging the piston in the other direction, means connecting said actuator and said valve whereby fluid pressure is applied to said actuator so as to positively reduce the speed setting of said governor means when said valve is applying fluid under maximum decrease pitch pressure to said servo-motor tending to decrease propeller pitch with the propeller at the low pitch stop position, and a fixed restriction in the connection between said valve and actuator for controlling the rate of flow from said actuator when said valve is operated to apply pressure fluid to said servo-motor to increase propeller pitch from the low pitch stop position, whereby the speed setting of the governor means will be positively increased by said continuously acting means at a fixed rate to the predetermined control speed setting thereof.

6. In combination with control mechanism for a variable pitch propeller, a variable pitch propeller having a hub, double-acting fluid pressure actuated means for adjusting propeller pitch, a source of fluid pressure, a governor valve rotatable with said hub and responsive to centrifugal force for controlling the application of fluid pressure to said pitch adjusting means to increase or decrease propeller pitch, and stop means limiting the low pitch position of said propeller; means operatively connected with said valve for applying a predetermined force thereto in opposition to said centrifugal force to establish a speed setting therefor, and means operable to positively reduce the force a predetermined amount to reduce the governor valve speed setting in response to application of fluid under maximum decrease pitch pressure to said pitch changing means tending to decrease propeller pitch when said propeller is at the low pitch stop position.

7. In combination with control mechanism for a variable pitch propeller, a variable pitch propeller having a hub, double-acting fluid pressure actuated means for adjusting propeller pitch, a source of fluid pressure, a governor valve rotatable with said hub and responsive to centrifugal force for controlling the application of fluid pressure to said pitch adjusting means to increase or decrease propeller pitch, and stop means limiting the low pitch position of said propeller; resilient means operatively connected with said valve for applying a predetermined force thereto in opposition to said centrifugal force to establish a speed setting therefor, and a fluid motor connected to said resilient means and operable to positively reduce the force of said resilient means a predetermined amount to reduce the governor valve speed setting in response to application of fluid under maximum decrease pitch pressure to said pitch changing means tending to decrease propeller pitch with the propeller at the low pitch stop position.

8. In combination with control mechanism for a variable pitch propeller, a variable pitch propeller having a hub, double-acting fluid pressure actuated means for adjusting propeller pitch, a source of fluid pressure, a governor valve rotatable with said hub and responsive to centrifugal force for controlling the application of fluid pressure to said pitch adjusting means to increase or decrease propeller pitch, and stop means limiting the low pitch position of said propeller; means operatively connected with said valve for applying a predetermined force thereto in opposition to said centrifugal force to establish a speed setting therefor, means operable to positively reduce the force a predetermined amount to reduce the governor valve speed setting in response to application of fluid under maximum decrease pitch pressure to said pitch changing means tending to decrease propeller pitch when said propeller is at the low pitch stop position, and time delay means operable to positively increase said force said predetermined amount to establish the original speed setting of said governor valve at a fixed rate in response to application of pressure fluid to said pitch changing means tending to increase propeller pitch from the low pitch stop position.

9. In combination with control mechanism for a variable pitch propeller, a variable pitch propeller having a hub, double-acting fluid pressure actuated means for adjusting propeller pitch, a source of fluid pressure, a governor valve rotatable with said hub and responsive to centrifugal force for controlling the application of fluid pressure to said pitch adjusting means to increase or decrease propeller pitch, and stop means limiting the low pitch position of said propeller; means operatively connected with said valve for applying a predetermined force thereto in opposition to said centrifugal force to establish a speed setting therefor, a fluid motor for positively varying said force to vary the governor valve speed setting, means connecting said fluid motor with said valve so that said fluid motor is actuated to reduce said force a predetermined amount in response to operation of said valve in applying fluid under maximum decrease pitch pressure to said pitch changing means tending to decrease propeller pitch with the propeller at the low pitch stop position, and means including a fixed restriction in said interconnecting means between the valve and the fluid motor for positively increasing said force said predetermined amount at a fixed rate to establish the original governor valve speed setting in response to operation of said valve in applying pressure fluid to said pitch changing means tending to increase propeller pitch from the low pitch stop position.

10. In combination with control mechanism for a variable pitch propeller, a variable pitch propeller having a hub, double-acting fluid pressure actuated means for adjusting propeller pitch, a source of fluid pressure, a governor valve rotatable with said hub and responsive to centrifugal force for controlling the application of fluid pressure to said pitch adjusting means to increase or decrease propeller pitch, and stop means limiting the low pitch position of said propeller; spring means operatively connected with said valve for applying a predetermined spring force thereto in opposition to said centrifugal force to establish a speed setting therefor, a fluid motor rotatable with said hub and operatively connected with said spring means for positively varying said force, said motor including a cylinder having disposed therein a piston capable of fluid pressure actuation in one direction and resilient means opposing fluid pressure actuation of said piston, a conduit interconnecting said valve and said cylinder such that said piston will be actuated to positively reduce said spring force a predetermined amount to reduce the governor valve speed setting in response to application of fluid under maximum decrease pitch pressure to said pitch changing means tending to decrease propeller pitch with the propeller at the low pitch stop position, and a fixed restriction in said conduit for metering the flow of fluid from said cylinder under the urge of said resilient means whereby said spring force is positively increased said predetermined amount to establish the original governor valve speed setting in response to application of pressure fluid to said pitch changing means tending to increase propeller pitch from the low pitch stop position.

11. In a variable pitch propeller, a hub having blades mounted therein for pitch adjustment, double-acting fluid pressure actuating means carried by said hub and connected to said blades for adjusting the pitch position thereof, a source of fluid under pressure, a governor valve rotatable with said hub and responsive to centrifugal force for controlling the application of fluid under pressure to the pitch adjusting means to increase or decrease the pitch position of said blades, stop means for limiting the low pitch position of said blades, spring means operatively connected with said governor valve for applying predetermined spring force thereto in opposition to said centrifugal force to establish a speed setting, a fluid motor rotatable with said hub including a cylinder having disposed therein a piston capable of fluid pressure actuation in one direction and resilient means engaging said piston for moving it in the opposite direction, a bellcrank interconnecting said piston and said spring means for positively varying the force of said spring means, a conduit interconnecting said governor valve and said cylinder for applying fluid under maximum decrease pitch pressure to said cylinder when the blades are at the low pitch stop position so as to effect movement of said piston to positively reduce said spring force a predetermined amount and thereby reduce the governor valve speed setting, and a fixed restriction in said conduit for metering the flow of fluid from said cylinder under the urge of said resilient means upon the application of fluid under pressure to said pitch changing means tending to increase propeller pitch from said low pitch stop position whereby said resilient means will effect movement of said piston to positively increase said spring force to reestablish the original governor speed setting.

References Cited in the file of this patent

UNITED STATES PATENTS

| 2,352,736 | Richmond | July 4, 1944 |
| 2,361,954 | Martin | Nov. 7, 1944 |
| 2,600,017 | Morris et al. | June 10, 1952 |

FOREIGN PATENTS

| 597,201 | Great Britain | Jan. 20, 1948 |